(12) United States Patent
Holmes

(10) Patent No.: US 8,773,743 B2
(45) Date of Patent: *Jul. 8, 2014

(54) OPTICALLY VARIABLE SECURITY DEVICE AND METHOD

(71) Applicant: De La Rue International Limited, Basingstoke (GB)

(72) Inventor: Brian William Holmes, Hampshire (GB)

(73) Assignee: De La Rue International Limited, Basingstoke (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/688,341

(22) Filed: Nov. 29, 2012

(65) Prior Publication Data

US 2013/0107335 A1    May 2, 2013

Related U.S. Application Data

(63) Continuation of application No. 10/507,079, filed as application No. PCT/GB03/01459 on Apr. 3, 2003, now Pat. No. 8,363,323.

(30) Foreign Application Priority Data

Apr. 3, 2002  (GB) .................................. 0207750.1
May 10, 2002 (GB) .................................. 0210787.8

(51) Int. Cl.
*G03H 1/00*   (2006.01)
*G02B 5/32*   (2006.01)

(52) U.S. Cl.
USPC .................. 359/2; 359/15; 359/569

(58) Field of Classification Search
USPC ................... 359/2, 3, 569, 576; 428/138
See application file for complete search history.

(56) References Cited

U.S. PATENT DOCUMENTS

| | | | |
|---|---|---|---|
| 5,128,779 A * | 7/1992 | Mallik | 359/2 |
| 5,282,066 A * | 1/1994 | Yu et al. | 359/3 |
| 5,513,019 A | 4/1996 | Cueli | |
| 5,539,544 A * | 7/1996 | Le Paih et al. | 359/15 |
| 5,606,433 A | 2/1997 | Yin et al. | |
| 5,719,616 A | 2/1998 | Danjo et al. | |
| 5,801,857 A * | 9/1998 | Heckenkamp et al. | 359/2 |
| 5,856,048 A | 1/1999 | Tahara et al. | |
| 5,886,798 A * | 3/1999 | Staub et al. | 359/2 |

(Continued)

FOREIGN PATENT DOCUMENTS

| | | |
|---|---|---|
| CA | 2238384 | 6/1997 |
| CH | 689 680 A5 | 8/1999 |

(Continued)

OTHER PUBLICATIONS

Van Renesse, Rudolf L., "Optical Document Security," TNO Institute of Applied Physics, 1998, pp. 75-111, Artech House, Boston.

(Continued)

Primary Examiner — Audrey Y Chang
(74) Attorney, Agent, or Firm — Oliff PLC

(57) ABSTRACT

A security device comprising at least first and second superposed optically variable effect generating structures (3-5, $3^1$-$5^1$), each having a surface relief microstructure, the second optically variable effect generating structure being viewable through the first.

29 Claims, 7 Drawing Sheets

(56) References Cited

U.S. PATENT DOCUMENTS

| | | | |
|---|---|---|---|
| 6,060,143 A | 5/2000 | Tompkin et al. | |
| 6,294,241 B1 * | 9/2001 | Kaule et al. | 428/138 |
| 6,299,213 B1 | 10/2001 | Souparis | |
| 6,747,768 B1 | 6/2004 | Knocke et al. | |
| 6,861,388 B2 * | 3/2005 | Ishibashi et al. | 503/200 |
| 8,363,323 B2 * | 1/2013 | Holmes | 359/576 |

FOREIGN PATENT DOCUMENTS

| | | |
|---|---|---|
| CH | 690 529 A5 | 9/2000 |
| EP | 0 201 323 | 11/1986 |
| EP | 0576173 A2 | 12/1993 |
| EP | 0 868 713 B1 | 1/2000 |
| JP | A-01-246582 | 10/1989 |
| JP | A-07-199781 | 8/1995 |
| JP | A-07-261646 | 10/1995 |
| JP | A-08-318657 | 12/1996 |
| JP | A-09-123627 | 5/1997 |
| JP | A-09-237030 | 9/1997 |
| JP | A-09-330009 | 12/1997 |
| JP | A-10-143057 | 5/1998 |
| JP | A-2001-315472 | 11/2001 |
| WO | WO 91/06925 | 5/1991 |
| WO | WO 00/73089 A1 | 12/2000 |
| WO | WO 02/00445 A2 | 1/2002 |

OTHER PUBLICATIONS

May 3, 2010 Office Action issued in EP Application No. 03720671.1.
Mar. 30, 2010 Office Action issued in JP Application No. 2003-580098 (with English translation).
May 28, 2013 Notice of Reasons for Rejection issued in Japanese Patent Application No. 2011-154462 (with English translation).
Apr. 19, 2013 Search Report issued in European Patent Application No. 10 17 5428.
Apr. 17, 2013 Search Report issued in European Patent Application No. 13 15 2894.

* cited by examiner

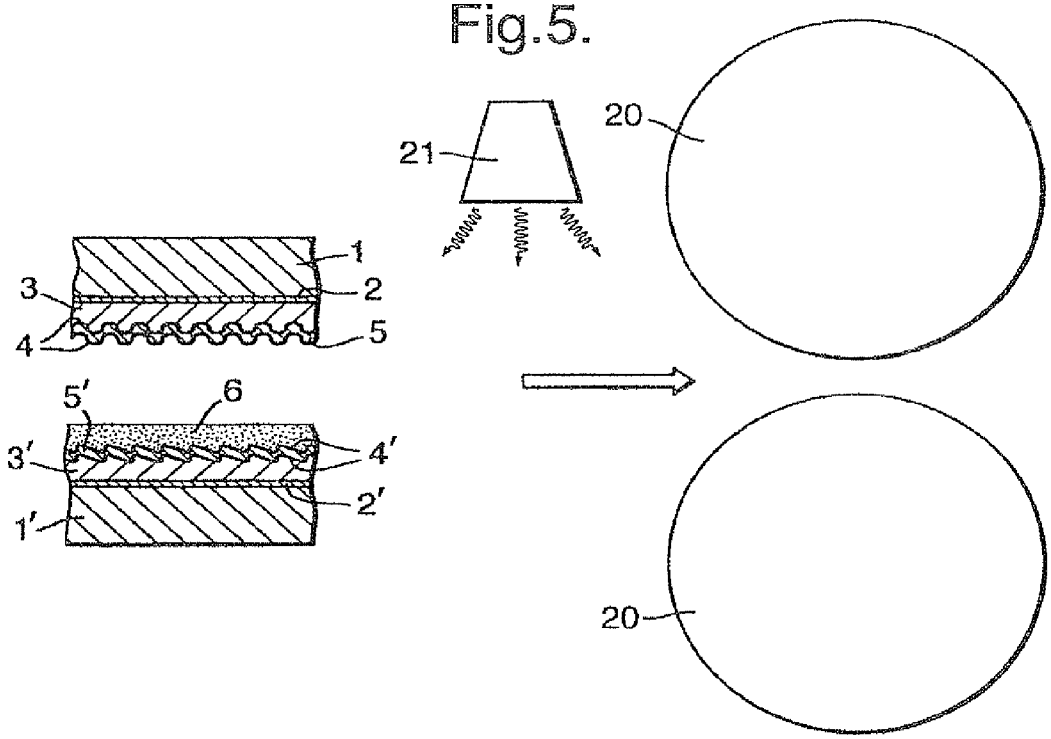
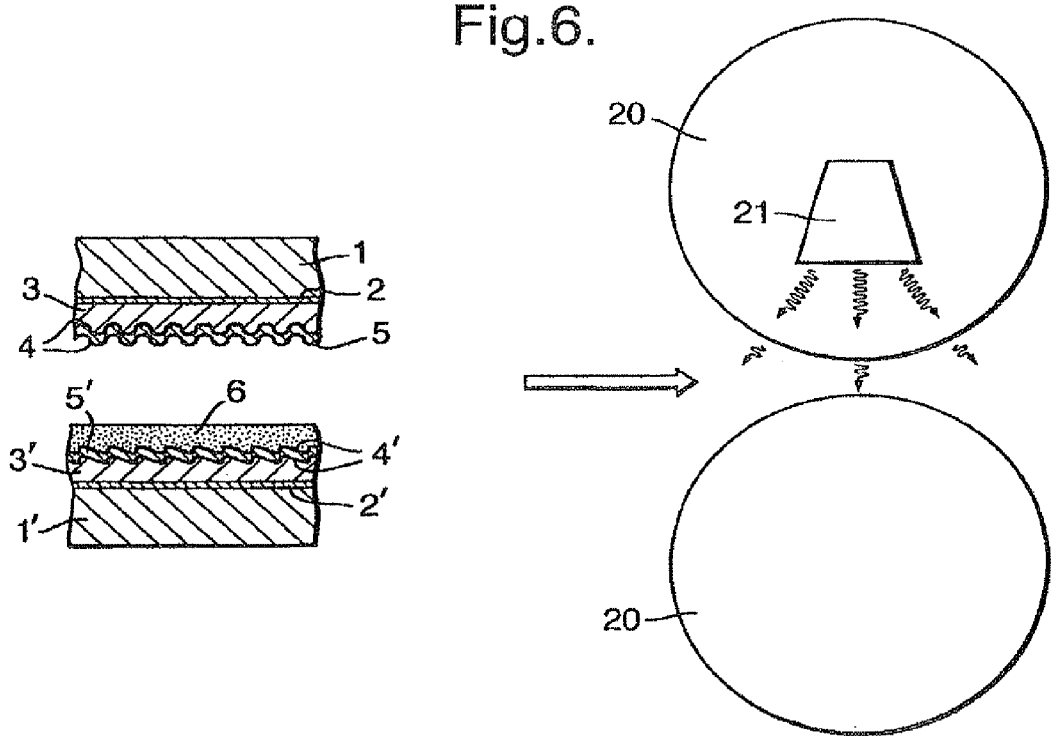

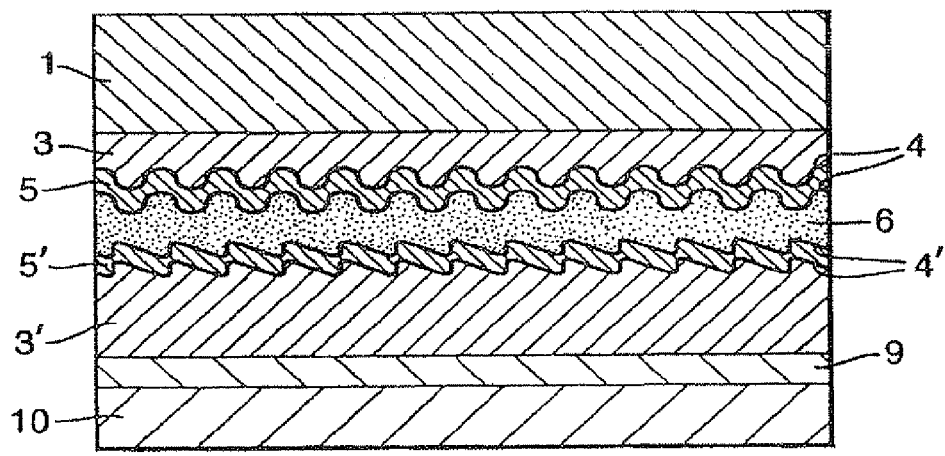
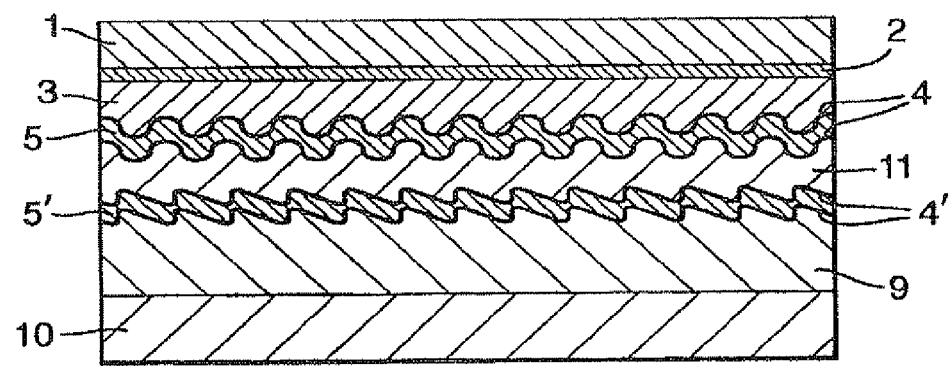
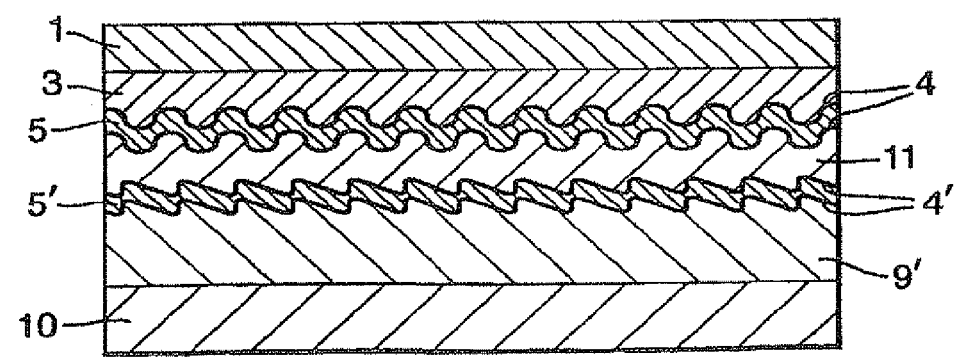

OPTICALLY VARIABLE SECURITY DEVICE AND METHOD

This is a Continuation of application Ser. No. 10/507,079 filed Oct. 8, 2004, which in turn is a National Phase of Application No. PCT/GB03/01459, filed Apr. 3, 2003, which claims the benefit of GB Application Nos. 0207750.1 filed Apr. 3, 2002 and 0210787.8 filed May 10, 2002. The disclosures of the prior applications are hereby incorporated by reference herein in their entirety.

The invention relates to a security device and a method of manufacturing such a security device. Such security devices are used for protecting security of documents, tokens of value and other articles.

Traditionally such documents have been used for financial transactions and have taken the form of banknotes, cheques, bonds, travellers cheques and vouchers. More recently secure documents and security devices per se have been used to confer the authenticity of goods and/or services. Security devices have been applied to packaging, labels and certificates accompanying goods such as software, entertainment media, high value consumer goods and fast moving consumer goods.

For both contemporary and traditional applications the essential problem remains the same, to provide a means of authentication that is easily recognisable by the public and secure against counterfeit. It has been found that the use of optically variable devices is a particularly effective method of meeting these criteria. Moreover it is generally recognised that the broader the range of technologies involved in the creation of a security device the greater its counterfeit resistance. Many Diffractive Optical Variable Identification Device=s (DOVID=s) intended to function as either thermally activated transfer structures (e.g. hot foils) or as label devices (applied through the application of pressure) require for their fabrication specialised expertise in optical physics, material science, chemistry, embossing, converting and often printing technology.

The use of DOVID=s as security devices has become far more prevalent in recent years and consequently the underlying component technologies/sciences have become increasingly accessible to would be counterfeiters. This is particularly the case when an attack is perpetrated by organised crime. In response to this, the holographic industry has increasingly resorted to including into the DOVID increasingly more complex overt, covert and machine readable features whose reproduction requires very significant capital investment in specialised machinery and stringent production/fabrication control.

In accordance with a first aspect of the present invention, a security device comprises at least first and second superposed optically variable effect generating structures, each having a surface relief microstructure, the second optically variable effect generating structure being viewable through the first.

In accordance with a second aspect of the present invention, a method of manufacturing a security device comprises providing at least first and second superposed optically variable effect generating structures, each having a surface relief microstructure, whereby the second optically variable effect generating structure is viewable through the first.

We have devised a new type of security device which is readily authenticatable but which is very difficult to counterfeit. This involves providing two (or more) superposed optically variable effect generating structures constructed so as to enable the or each underlying structure to be seen through the overlying structure(s).

Although stacked volume holograms are known within the prior art, e.g. EP 576173 and U.S. Pat. No. 5,606,433, with the purpose of creating a composite structure that replays over a number of wavelengths determined by the number of layers superposed. Specifically, this is required because volume holograms function through Bragg reflection and therefore only replay incident light of a particular colour wavelength and angle of incidence.

The present invention increases the visual sophistication, security and differentiation of the diffractive or holographic imagery present within the DOVID.

Currently within secure OVD manufacture there are the dual pressures of increasingly sophisticated market demands and remaining one step ahead of the counterfeiters using low-end origination technology (e.g. low spec dot-matrix and interferential masking techniques). As a result origination providers have made limited efforts to combine at the primary microstructure mastering stage certain complimentary origination technologies (the most prevalent would be dot matrix imagery overshot onto a classical 3D or 2D/3D hologram) or alternatively to mechanically recombine image components generated using different technologies to build up the final composite image.

The current invention provides a novel device and method for combining into a single filmic assembly, two or more separately originated optically variable microstructures (OVM=s), which can be either image generating or machine-readable. Fundamentally the method involves superposing or stacking two or more optically/interferometrically uncoupled microstructure sub-assemblies.

In preferred examples, the uppermost or first OVM sub-assembly defining the first OVM relief (OVM1) is intimately coated with a reflection enhancing layer which could take the form of either:

1) A discontinuous reflective metal coating (provided with substantial de-metallised substantial regions or windows of transparency), or 2) A continuous transparent coating of thickness optimised HRI material (e.g. ZnS, $TiO_2$).

The lower OVM sub-assembly defines the second OVM relief (OVM2) coated with a reflective opaque layer or metal which may be selectively de-metallised (or is provided with a reflective HRI material).

It should be noted that the desired appearance of the proposed DOVID is one where the DOVID appears to be one complex unitary metallised OVM whose microstructure appears to be generated by the superposition of two separate origination processes. The origination processes should be chosen such that DOVID does not appear to be composed of two separate microstructure layers simply laminated together.

To date within the holographic industry each of the main origination providers has tended to specialise in one of the limited number of origination technologies that can be used to fabricate image generating optical variable microstructures (OVM=s). Examples of such origination techniques include: classical two-step rainbow holography, dot-matrix interferometry, lithographic interferometry and e-beam lithography.

It is preferable that two distinctly different origination technologies, for example e-beam lithography and two-step rainbow holography are used to create OVM 1 and OVM 2.

In a further embodiment one of the optical microstructures will be present as volumetric Bragg planes and thus the associated optically variable layer will function as a volume hologram, examples of volume holograms can be found in EP 516173 and EP 5606433. Physically the microstructure will be present as a periodic distribution of planar regions of localised refractive change; either enhanced or reduced—with each layer scattering a small fraction of the light propagating through the layer. When light of a certain wavelength (e.g. the original recording wavelength or close to it) and angle of incidence (the original reference beam recording angle or close to it) propagates through the layer then all of the partial amplitudes scattered/reflected by each plane will be in phase and constructively interfere—this is known as the Bragg effect.

It should be appreciated that since the microstructure is volumetric and multi-planar in nature there is no requirement (or benefit) from a reflection enhancing coating. Though commonly to ensure that the image provided by the volume hologram does not have to compete with the light back-scattered by the substrate, that side of the volume hologram which is to be bonded to the substrate is coated with a dark opaque film (typically black). Though of course the opaque colorant may also be provided within the adhesive or bonding layer. It should be appreciated that because of the thickness of the photopolymer layer and its associated PET support layer (e.g. 15 microns and 50 microns respectively for DuPonts Omnidex[7] material) the composite assembly (OVM1 plus OVM2) will necessarily be applied as a die-cut label rather than as a hot-stamped or thermal roll-on device.

The device may be applied to a substrate or article to be protected in two distinct ways. Firstly by thermally activated transfer from a carrier foil (e.g. hot-foiling/stamping, roll-on etc.) or by application as a label utilising a non-heat activated adhesive. Examples of substrates or articles to which security devices according to the invention may be applied include banknotes, cheques, bonds, travellers cheques, stamps, certificates of authenticity, high value packaging goods and vouchers.

Some examples of devices and methods according to the invention will now be described with reference to the accompanying drawings, in which:

FIG. 2a illustrates a first example of the first OVM shown in FIG. 1a;

FIG. 2b shows a second example of the first OVM of FIG. 1a;

FIG. 3 is a schematic cross-section through the second OVM shown in FIG. 1a;

FIG. 5 is a view similar to FIG. 4a but illustrating the use of a UV lamp;

FIG. 6 is a modified version of the FIG. 5 example;

FIG. 7 is a schematic cross-section through an example of a label device;

FIG. 8 illustrates a device formed by fabricating each layer successively to generate a transfer foil;

FIG. 9 illustrates schematically in cross-section a label device folined by successive provision of layers; and, FIGS. 10 to 14 illustrate some further examples.

THERMAL TRANSFER DEVICE

Figure 1A:
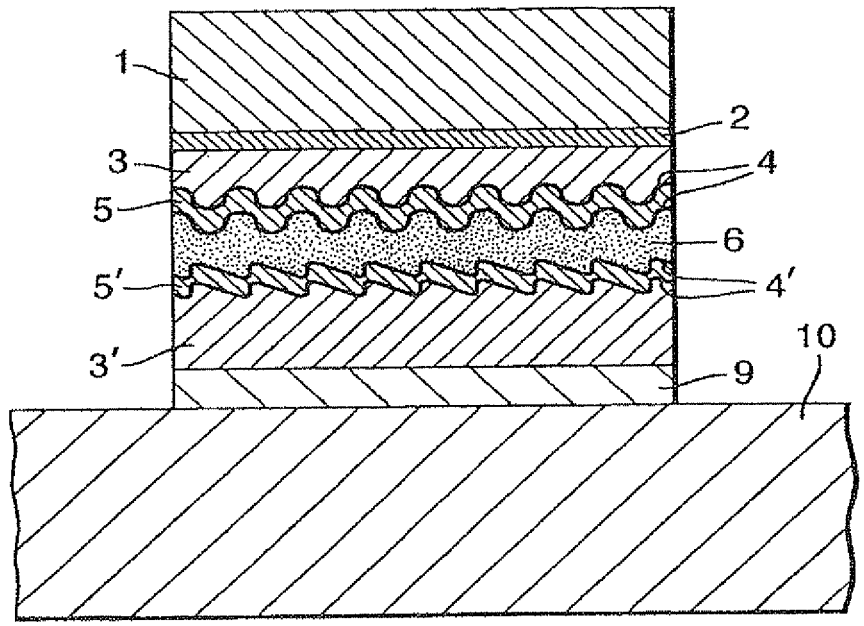
FIG. 1a is a cross-section through a first example of a thermal transfer embodiment prior to completion of the transfer process.
Figure 1B:
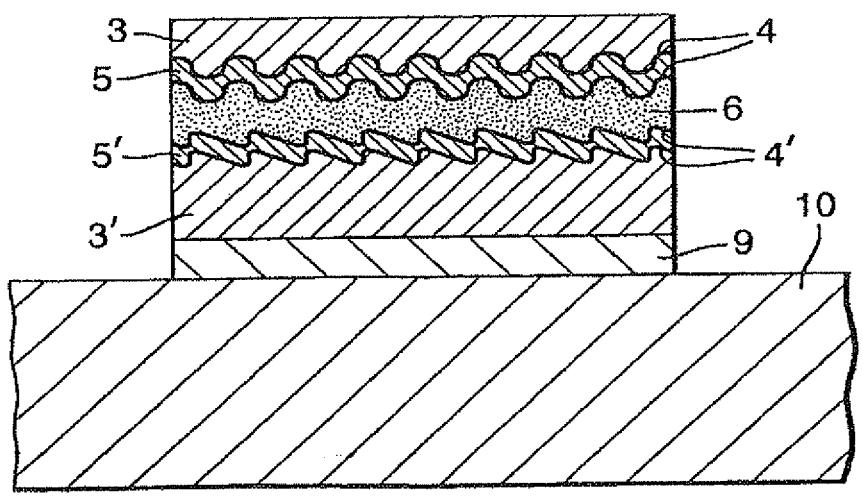
FIG. 1b illustrates the example of FIG. 1a after transfer.

We first describe a method for fabricating the layer assembly necessary to allow the device/invention to function as thermal transfer structure (see FIGS. 1a and 1b).

Production of OVM1 Subassembly

Onto a carrier layer 1, typically 16-50 microns PET, a waxy release layer 2 of typically 0.01-0.1 microns thickness is applied followed by a thermoformable lacquer layer 3, typically 1-2 microns thick. The thermoformable layer 3 is then embossed with an optical microstructure 4. The optical microstructure is then coated with a reflection enhancing layer 5. Two types of reflection enhancing layer would be appropriate for this application.

Figure 2A:
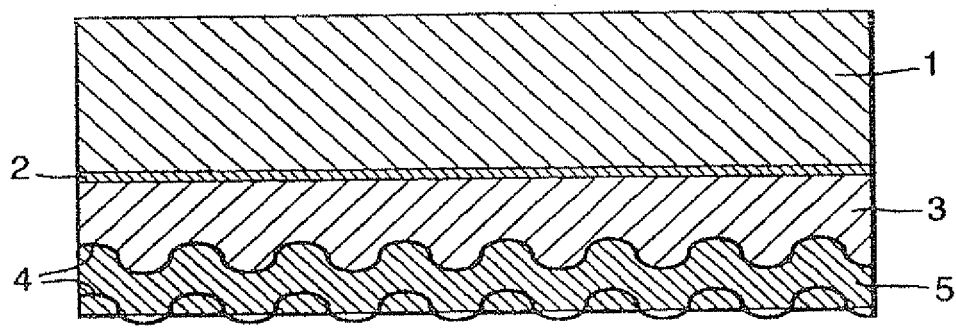

The first option (FIG. 2a) is to vacuum coat the microstructure 4 with a transparent high refractive index (HRI) layer of dielectric material (examples being ZnS, $TiO_2$, $ZrO_2$ deposited approximately 0.2-0.6 microns thick).

Figure 2B:
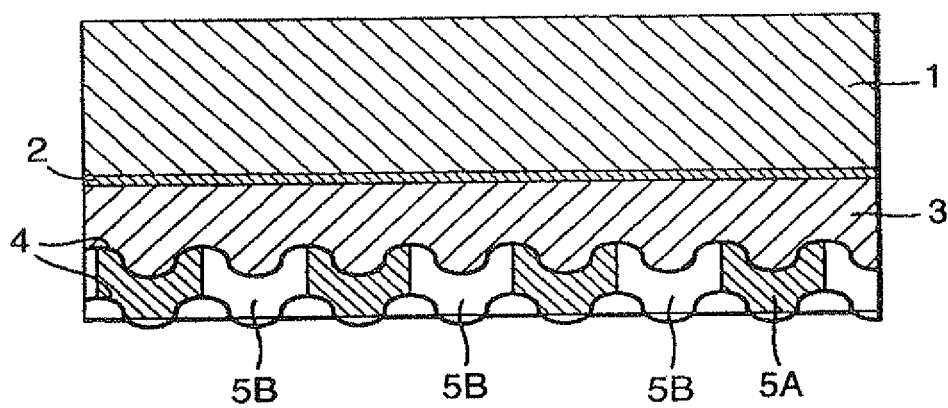

The second option (FIG. 2b) is to first vacuum coat the microstructure 4 with an essentially opaque layer of Aluminium 5A, then selectively de-metallise regions 5B of the OVM area, this may be done in register with the microstructure image. Demetallisation is commonly achieved by using print mask and etch approach or by directly printing the etchant.

It should be noted that by using an OPP (oriented polypropylene) carrier 1 an embossing lacquer would not need to be present. The optical microstructure can be embossed directly into the OPP. The rest of the manufacturing process for the OVM1 subassembly remains unchanged.

Production of OVM2 Subassembly

Figure 3:
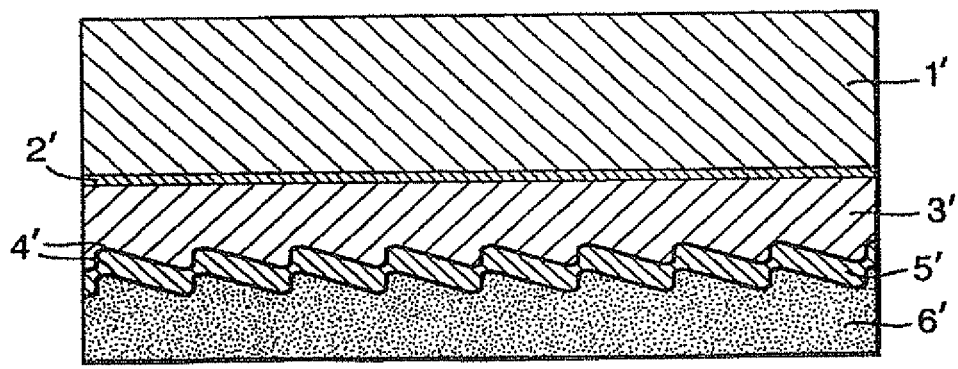

A second foil assembly is produced (FIG. 3) similar to OVM1 with a carrier 1' and a release layer 2' which is weaker or looser than the release layer 2 of OVM1 (in order to facilitate the combination of the two sub-assemblies). A lacquer layer 3' is provided also. This foil structure is then embossed with a second optically variable microstructure 4' and vacuum coated with an opaque reflective metal coating 5' (typically aluminium 30-60 nanometres thick).

The sub assembly is then coated with an optically clear bonding or laminating layer 6 a few gsm in weight. Suitable materials for the bonding layer 6 are UV curing adhesives such as COATES UV CC E50, and self curing adhesives based upon, for example, acrylic/iso-cyanate curing urethanes.

Laminating Two Sub-Assemblies Together

Figure 4A:
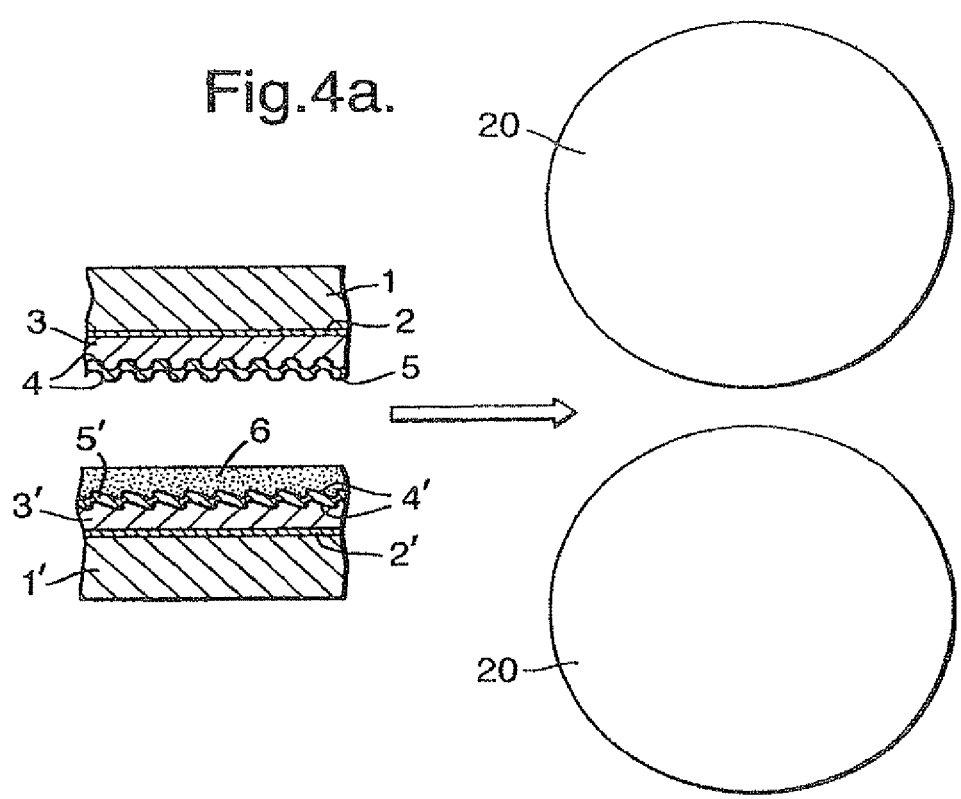
FIGS. 4a and 4b illustrate successive stages in laminating the two OVM structures together.
Figure 4B:
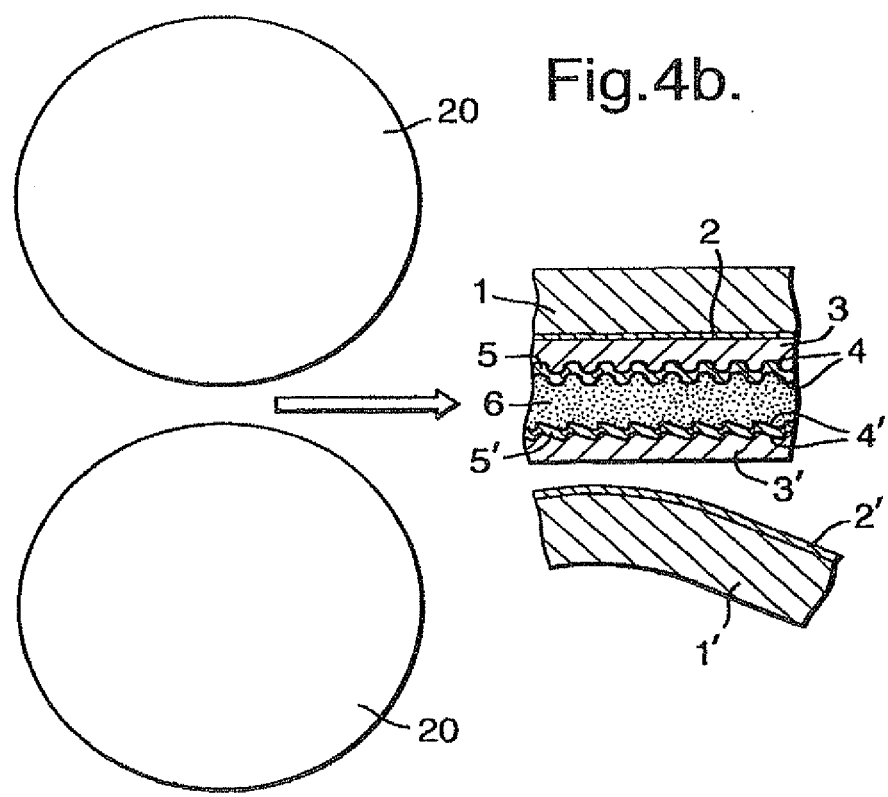

The two sub assemblies OVM1 and OVM2 must now be laminated together. This involves transferring the transferable layers of the OVM2 sub-assembly (i.e. those layers 3'-6 below the release) onto the back of the OVM1 sub-assembly by passing the two sub assemblies through a pair of laminating nip rollers 20 (FIGS. 4a,4b) and then peeling off the OVM2 carrier 1'.

In the case where the laminating adhesive 6 is a UV curable composition, the combined foil assemblies can be irradiated just prior to their passing through the nip rollers 20 with UV, the UV source 21 being necessarily on the OVM1 side of the combined assembly (FIG. 5). Alternatively the nip roller 20' on the OVM1 side of the laminate could be manufactured of materials transparent to UV light, the UV source 21 being located within its circumference (FIG. 6).

Finally the back of the combined assembly is coated with a thermally activated adhesive 9 such as DLRH RK14 (coat weight 1.5 B3 gsm) and then rewound: in readiness for slitting and hot stamping.

Note with respect to hot stamping foils, in order to facilitate clean fracture and therefore release it is preferable that the total thickness of the transfer assembly does not exceed 7-8 μmetres. For roll-on stripe applications this could be increased to 10 μmeters.

In use, the structure shown in FIG. 1a is brought into contact with a substrate 10 such as a document of value or the like and the adhesive 9 is thermally activated using a hot stamping die or the like. Following activation, the carrier 1 is peeled off as a result of the presence of the wax release layer 2 leaving the device secured to the substrate 10 as shown in FIG. 1b.

The construction described above may be further modified to form a label device, the structure of such a device is shown in FIG. 7. The structure remains essentially unchanged except that the wax release layer 2 is now absent from the OVM1 sub-assembly and the carrier 1 is transparent. It is also possible that the carrier and embossing layer may be unified into one material/layer, typically the case when using PVC or OPP.

The manufacture of such a label device will differ from the hot-stamping product at two points. During manufacture of OVM1, the wax release layer 2 will not be present and the embossing lacquer 3 is optional as discussed. Secondly, the heat activated adhesive 9 is replaced with a pressure sensitive adhesive 9'. A suitable pressure sensitive adhesive such as NA1197 (National Adhesives) should be applied at a coat weight of 10-15 gsm.

Alternative Method of Manufacture

In an alternative approach the two sub-assemblies are not separately fabricated and subsequently bonded together. Instead the complete assembly is fabricated by the successive application and manipulation of each of the layers resulting in the structure shown in FIG. 8 for hot foil applications and FIG. 9 for label applications. These will now be described in more detail.

Hot Foils

The OVM1 sub-assembly is manufactured as described above with layers 1 to 5 (FIG. 2a). An embossing lacquer 11 is then applied by gravure coating to the back of the reflection enhancing layer 5 (HRI or demet) and it is then embossed with the second optical microstructure 4' (FIG. 8). It is preferable that this embossing lacquer 11 has a significantly lower glass transition temperature ($T_g$) than the lacquer 3 supporting the first optically variable microstructure 4. An alternative approach would be to use a UV curable monomer composition rather than an embossing lacquer. The second optically variable relief could then be cast into the UV curable monomer and cured. Such techniques are described in more detail in U.S. Pat. No. 4,758,296. The second optically variable relief 4' is then vacuum coated with metal such as Aluminium 5' (a typical thickness of aluminium is 30B60 nm) and then coated with a thermally activated adhesive 9 (e.g. DLRH RK14). The final product is then re-wound in readiness for application to a substrate 10.

Labels

Two approaches have been identified for the manufacture of labels. The first approach (FIG. 9) differs from the heat activated transfer structure only in that the wax release layer 2 is absent from the OVM1 assembly and a pressure sensitive adhesive 9' is used rather than a thermally activated adhesive 9.

As an alternative approach (not shown) an optically clear polymeric film (typically 25-100 microns thick) which if it has suitable thermoplastic characteristics (appropriate glass transition temperature etc) is directly embossed with an optical microstructure into what we shall refer to as its lower surface. Suitable polymers include polypropylene, PVC and less so Polyester due to its high glass transition temperature. Polymers with unsuitable thermoplastic characteristics include polyester or more particularly liquid crystal polymers require the lower surface to be coated with a suitable thermoplastic film or lacquer (1-5 microns thick) prior to embossing.

The lacquer is embossed with the OVM1 microstructure and next the microstructure is vacuum metallised with a substantially opaque layer of metal. It is usual to coat a thickness of between 10 and 100 nm especially 30-60 nm. Typically Aluminium, but Copper or any distinctively coloured alloys could be used. The metal layer may then be selectively demetallised if necessary.

The OVM2 subassembly is then laminated onto a Glassine paper coated with between 10 and 20 gsm of pressure sensitive adhesive. Next the upper surface of the OVM2 subassembly is coated with an optically clear laminating adhesive (the adhesive may be heat, UV or self curing as described previously). Finally the OVM1 subassembly is transferred (from its carrier) onto the upper surface of OVM2 subassembly by passing through a nip whilst activating laminating adhesive through the action of heat or UV light.

Additional Printing or Coating Enhancements

It should be appreciated that the device could be further enhanced by the incorporation of additional materials into or between appropriate layers. All embodiments described within EP-A-497837 are hereby included by reference. The various enhancements described within EP-A-497837 could be incorporated between microstructure and reflection enhancing layer in either OVM1 or OVM2.

Further to this dyes or pigments could be incorporated into the laminating adhesive. Such pigments may provide colouration or luminescent effects (phosphorescent and fluorescent). Such materials are well known within the security industry and it is well known to use materials demonstrating either stokes or anti-stoke shifts. Finally other optically variable materials could be used in the laminating adhesive such as photochromics and thermochromics.

As we stated before the current invention creates a laminate structure composed of two or more surfaces/layers of microstructure whose optically variable generating effect appears to derive from one optical effect generating microstructure.

Note OVM1 and OVM2 could each have been generated by a single origination technology such as classical holography. However it is possible that each of the microstructures could have been separately generated using two or more distinct origination technologies and therefore can in themselves can be made very secure. Therefore in principle, by visually integrating the optical variable effects generated by OVM1 and OVM2 in ostensibly a single microstructure, a device can be created of unique optical appearance, which the counterfeiter and most skilled holographers would regard as prohibitively difficult to reproduce.

In the preferred embodiment OVM1 is intimately coated with a completely transparent high refractive index (HRI) dielectric material 5 (typically ZnS, $TiO_2$, or $ZrO_2$ all having a refractive index of approximately 2) with an optical thickness of approximately a quarter wave (i.e. around 100 nm for an index of 2) though in contrast to specularly smooth interfaces the thickness of the HRI layer on diffractive relief is not critical. In this preferred embodiment because of the relatively low reflectivity of HRI when compared to a (near opaque film of Aluminium (e.g. at best of the order off a sixth as bright) it is important that OVM1 has intrinsically a high diffractive brightness compared to OVM2, i.e. OVM1 should be composed of pure grating structures such that there is minimal diffusion of the diffracted light and no depth effects. Suitable origination methods to generate OVM1 in this case would be dot-matrix interferometry, lithographic interferometry and e-beam lithography (the latter two would include origination technologies such as the Kinegram7 and Exelgram7). OVM2 should preferably generate either a form of iridescence or virtual/apparent depth effect which contrasts and complements the optically variable effect generated by OVM1. Thus OVM2 would preferably be a classical hologram (model, 2D-3D), a Zero-Order diffractive device (ZOD)

or a Fresnel structure operating in its very lowest harmonics (a hybrid effect of diffraction and reflection). To balance out their brightness one could further incorporate a colourant or dye into the laminating adhesive to spectrally filter (colour) the replay from OVM2.

A second preferred embodiment is as follows. The uniformly transparent HRI reflection enhancing layer 5 is replaced with a selectively metallised coating of Aluminium (FIG. 2b) and therefore OVM1 need not necessarily be intrinsically very bright. Therefore OVM1 could be provided by origination technologies that generate diffuse diffraction (as for OVM2 in the embodiment above) as well as non-diffuse (as for OVM1 in the embodiment above). Generally it will be especially desirable that the selective metallisation is in register with the image patterns provided by OVM1.

Two such examples would be:
1. OVM1 and OVM2 are complementary ZOD=s B for example behind OVM1, the metallisation may be provided in the shape of a De La Rue head on a clear surround. OVM1 may be fabricated to replay a green iridescence when say vertically oriented and Brown when horizontally oriented, Whereas OVM2 may be provided such that it replays Brown when vertically oriented and green when horizontally oriented. Therefore the overall device will have the appearance when vertically oriented of a green Head on brown background and when horizontally oriented, of a brown head on a green background. This simple swap-over effect is a powerful authentication feature.
2, The designers of Kinegram[7]=s and Exelgram[7]>s and other forms of interferential and non-interferential lithographically generated diffractive optically variable devices, often exploit the fact that from a fabrication viewpoint they can readily alter the orientation (azimuthal angle) of their elemental grating structures by 90[1] to generate orthogonal images. Such that for vertical orientation a first graphical image is diffracted into the observers eye, whilst rotating the device (about an axis normal to its plane) by 90[1] generates (horizontal orientation) diffracts or relays a second graphical image into the observers eye. This orthogonal image switch is a very powerful feature.

By contrast within a classical two-step rainbow hologram the ability to change the orientation (azimuthal) angle is constrained making the generation of truly orthogonal images difficult. Therefore an important aspect of certain examples of this invention is the design feature that OVM1 and OVM2 contain orthogonal holographic images generated by classical holography. Though of course either or both microstructures may also contain other origination technologies (e.g. dot-matrix overlays).

Figure 10:
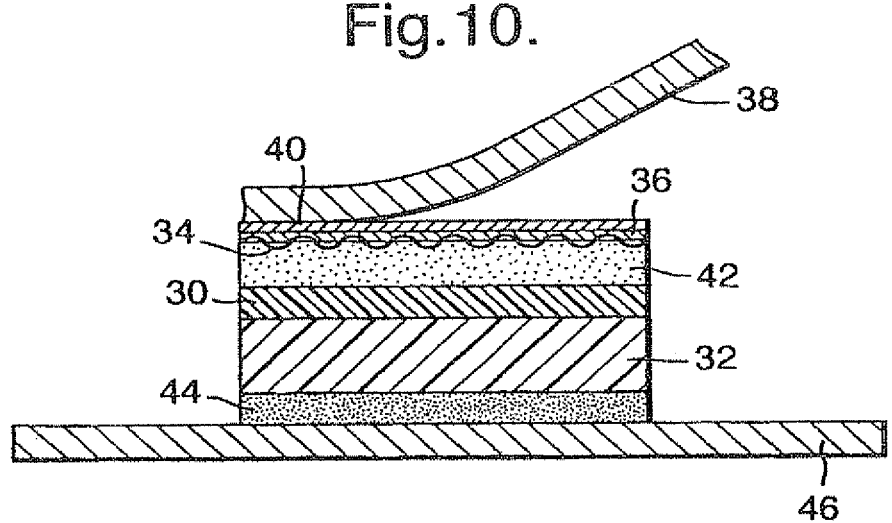

A further example making use of a volume hologram for OVM2 is shown in FIG. 10—essentially it is composed of a lower assembly (OVM2) which contains a photopolymer Bragg or volume hologram layer provided on a Mylar7 PET support layer which is in turn bonded to the substrate of the protected article. An upper assembly (OVM1) composed of a lacquer or thermoplastic embossed with the OVM1 microstructure which has been vacuum-coated with a transparent high refractive index coating and then transfer-laminated or bonded on to the upper surface of lower assembly (i.e. the photopolymer). This assembly as it stands will be transparent or at least translucent and therefore any printed or photographic information present on the substrate will be viewable. If desired a colorant can be provided in the adhesive or alternatively within a coloured (possibly opaque) primer layer located between the supporting layer (PET) and the adhesive.

The method of manufacture of this assembly is as follows:
1) Fabrication of OVM2 Sub-Assembly
1) a volume hologram is first recorded in a photo-polymerizable layer 30, the resultant Bragg structure is then stabilised or cured by exposure to light (typically actinic or UV). The hologram may then be optionally subjected to a subsequent heating process to enhance its brightness or replay efficiency. The exposed surface of a support layer 32 of 10-200 μm thickness may optionally be provided with a primer coating (not shown) which can have the appearance of a continuous coloured opaque coating or be provided as a printed coloured pattern (covering the majority of the surface so as not to reduce bond strength). Alternatively incorporating a dye into the support layer may provide opacity and or colour. Following curing a protective top sheet or layer (typically a weakly adhered 20 micron PET) which prevents the photo polymerization process being poisoned by oxygen, may be removed or retained up until the final laminating of the two sub-assemblies.
2) The volume hologram is then laminated to adhesive (pressure sensitive) coated glassine release paper—the adhesive being in contact with the support layer. The adhesive should be of a type which forms a very strong bond to the PET support layer 32 and is resistant to chemical attack. Separately, we create the OVM1 sub-assembly by embossing the OVM1 surface relief microstructure 34 into a thermoplastic or lacquer layer 36 (0.5-5 microns thick) provided on a release coated carrier 38 (typically Polyester, 12-50 microns thick, especially 25 microns). Alternatively the carrier 38 could be vacuum coated with either a transparent reflection enhancing layer (HRI) 40 or semi-transparent reflection enhancing layer (e.g. partial metallisation which may or may not be in register with optically variable image provided by OVM1). Finally the structure is coated with a laminating adhesive or bonding layer 42 that may be either heat activated (hot-stamping), pressure activated or a UV cured adhesive.
3) Finally we transfer the OVM1 sub-assembly (vis-à-vis the releasable carrier) onto the photopolymer surface 30 of the OVM2 sub-assembly. It may be an important security design feature that during the lamination process the images provided by OVM1 and OVM2 maintain a predetermined spatial relationship or register. Similarly should the reflection enhancing layer 40 for OVM1 take the form of selective-metallisation then it may be desired that this metallisation be registered to the image provided by the optical effect provided by OVM1 and or OVM2. Finally the continuous sheet or web of images or holograms may then be die-cut into label units and the waste matrix peeled off.

The resulting labels can be adhered using a conventional transfer process via a pressure sensitive adhesive 44 to a substrate 46.

Figure 11:
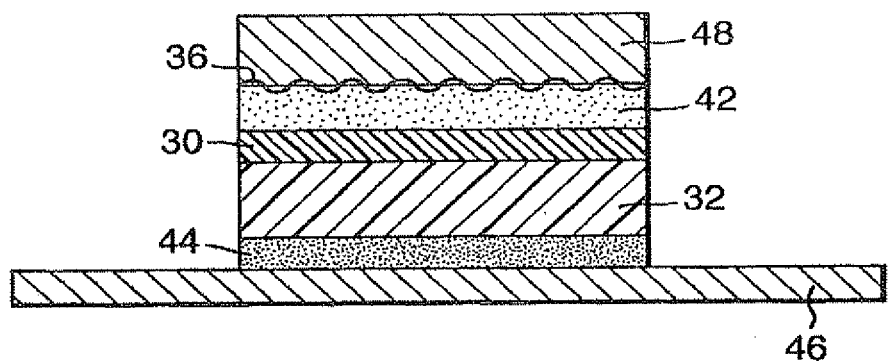

A second embodiment is shown in FIG. 11, essentially this differs from the previous embodiment in respect of the construction of OVM1 sub-assembly. Specifically instead of OVM1 being embossed into a transferable lacquer it is instead embossed directly into a non-release coated support/carrier layer 48. The construction steps are as follows:

Fabrication of OVM2 sub-assembly
1) As described above.
2) Not applicable—this time lamination to adhesive coated glassine paper or release sheet 46 occurs after the two sub-assemblies have been united.
3)

Fabrication of OVM1 Sub-Assembly
3) Emboss OVM1 microstructure either: directly into support/carrier layer 48 (e.g. PVC, Polycarbonate, OPP or less suitably PET thickness 10-100 μm) or alternatively into a carrier layer coated with an embossable lacquer this time omitting the release layer. The carrier has a typical thickness range of 12-50 microns preferably 12-25 microns).

4) Next vacuum coat with a reflection enhancing layer 36 (HRI or partial metallisation).

5) Next coat with a laminating adhesive 42 (thermally activated, pressure activated or UV cured).

6) The two sub-assemblies are then laminated together by passing through a pair of nip rollers with OVM2 sub-assembly oriented such that the photopolymer side is brought into contact with the bonding or laminating adhesive in OVM1 sub-assembly. We have discussed before, when describing the fabrication of assemblies containing two surface relief microstructures, the particular lamination process/system which pertains when the laminating adhesive is either thermally activated or functions through photo-polymeric cross linking (e.g. UV cured) and will not repeat it here. Optionally the PET support layer 32 can again be provided with a coloured primer layer either as a continuous coating or as a patterned discontinuous coating. Finally the composite structure can be laminated to adhesive 44 (pressure sensitive) coated glassine paper 46 and die-cut etc as before.

7) It should also be noted that there is a construction option at this phase (which may be exercised if the photopolymer hologram layer is weakly bonded to the support layer). The volume hologram support layer may be peeled off following lamination. The composite assembly is then laminated to adhesive coated glassine paper. UV cured materials are often difficult to bond to so it may be necessary to either develop a special formulation of pressure sensitive adhesive or to provide an intermediary primer layer between volume hologram and adhesive.

Figure 12:
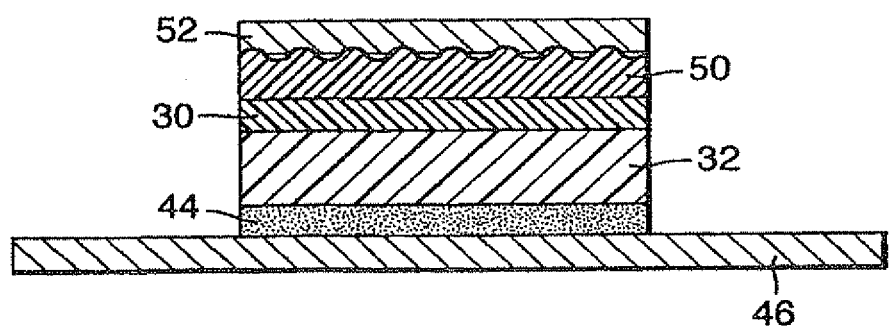

It is also possible to construct the composite device without having to laminate the two devices together (FIG. 12). Here we take the OVM2 sub-assembly consisting of the volume hologram 30 and underlying support layer 32 and coat the surface of the volume hologram with an embossable thermoplastic or UV polymerizable coating 50. The coating is then embossed by the action of heat and pressure with a suitable surface relief structure. Alternatively the surface relief can be formed using a cast and cure technique. If the surface relief structure of OVM1 can be protected by a top coat or vanish 52 then it will be necessary to provide the surface relief with a reflection enhancing layer e.g. HRI or partial metallisation.

Finally the volume hologram (OVM2) support layer is provided with adhesive 44 either directly or indirectly by laminating to an adhesive coated release sheet 46 as before.

Figure 13:
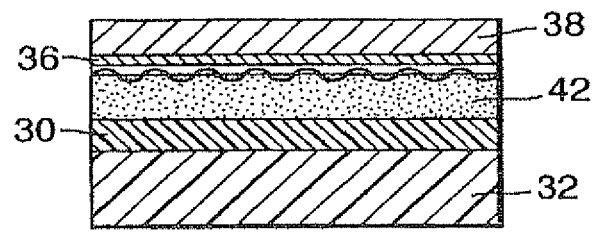
Figure 14:
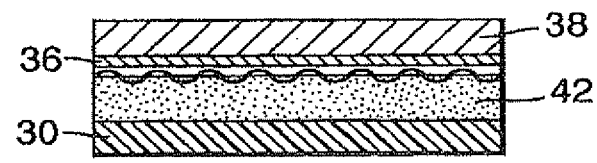

It should be appreciated that the construction methods proposed for fabricating the second embodiment could also be used to generate a suitable layer assembly for use as a holographic thread for incorporation into Banknotes (paper and polymer), security labels etc. Essentially it means omitting the final provision of an adhesive coat. Two possible thread structures are shown in FIG. 13 and FIG. 14, differentiated by the fact that in the former (FIG. 13) the photopolymer=s PET support layer 32 is retained as one of the outward facing layers whilst in the latter (FIG. 14) the photopolymer 30 provides one of the outward facing layers.

Within the former, it is desirable that that the overall assembly thickness does not exceed 45 microns and therefore the two outward facing polymeric support layers should have a individual thickness preferably around 10-15 microns and the photopolymer hologram layer preferably between 10-20 microns. The same overall thickness constraint applies to the latter structure but because it has lost the volume holograms support layer—this is more readily achieved.

Finally it should be stressed that the inventive concept here is the concept of a visually integrated image provided for example, by the combination of a diffractive or holographic surface relief image and a volume/Bragg hologram and not the precise construction of the assembly—for example in several of the embodiments described it may be desirable to reverse the order of the volume hologram and its support layer such that the former is nearest the substrate and the latter nearest OVM1 sub-assembly. Also we have specified PET as the support layer, however it may be substituted by any optical polymeric material with the desired optical/mechanical properties.

The values that we have specified for layer thickness and coat weight are no means anticipated as being comprehensive and therefore we regard structures which function according to the inventive concept but have layer thicknesses or composition=s that fall outside those specified herein to still fall within the scope of the invention.

The invention claimed is:

1. A security device comprising at least first and second superposed diffractive or holographic optically variable effect generating structures, each structure having a surface relief microstructure, the second optically variable effect generating structure being viewable through the first, wherein the first optically variable effect generating structure includes a discontinuous metallic layer, wherein a dye or pigment is provided between the optically variable effect generating structures, and wherein the replay characteristics of the structures generate a visually integrated image, an optically variable generating effect of the visually integrated image appearing to derive from one optical effect generating structure.

2. A device according to claim 1, wherein the second optically variable effect generating structure includes an opaque, reflective layer.

3. A device according to claim 1, wherein the first and second optically variable effect generating structures have been originated by different processes.

4. A device according to claim 1, wherein the first and second surface relief microstructures have been originated by one of dot matrix interferometry, lithographic interferometry, e-beam lithography and two-step rainbow lithography.

5. A device according to claim 1, wherein the first and second optically variable effect generating structures are laminated together via a laminating adhesive.

6. A device according to claim 5, wherein the dye or pigment comprises a photochromic material, a thermochromic material or a luminescent material in the laminating adhesive.

7. A device according to claim 1, further comprising a carrier layer supporting the first and second optically variable effect generating structures.

8. A device according to claim 7, wherein the carrier layer is secured to the first and second optically variable effect generating structures via a release layer.

9. A device according to claim 1, wherein one or more of the optically variable effect generating structures is formed in a respective lacquer layer.

10. A device according to claim 1, wherein at least one of the optically variable effect generating structures is formed in a polymer material.

11. A device according to claim 1, further comprising an adhesive layer to enable the device to be secured to a substrate.

12. A device according to claim 1, further comprising one or more additional optically variable effect generating structures provided between the first and second optically variable effect generating structures.

13. A document carrying a security device according to claim 1.

14. A document according to claim 13, the document selected from the group comprising banknotes, checks, bonds, traveler's checks and vouchers.

15. A document according to claim 14, wherein the document is a banknote.

16. A device according to claim 1, wherein the discontinuous metallic layer is registered with the surface relief microstructure of the first optically variable effect generating structure.

17. A method of manufacturing a security device, the method comprising providing at least first and second superposed diffractive or holographic optically variable effect generating structures, each structure having a surface relief microstructure, providing the surface relief microstructure of the first optically variable effect generating structure with a discontinuous reflective metal layer; and providing a dye or pigment between the optically variable effect generating structures, whereby the second optically variable effect generating structure is viewable through the first, and wherein the replay characteristics of the structures generate a visually integrated image, an optically variable generating effect of the visually integrated image appearing to derive from one optical effect generating structure.

18. A method according to claim 17, wherein each optically variable effect generating structure is formed by embossing a corresponding surface relief microstructure into an embossing layer.

19. A method according to claim 17, wherein the embossing layer comprises an embossing lacquer or polymer.

20. A method according to claim 17, wherein the first and second optically variable effect generating structures are originated by different processes.

21. A method according to claim 17, wherein an origination processes is chosen from dot matrix interferometry, lithographic interferometry, e-beam lithography and two-step rainbow lithography.

22. A method according to claim 17, wherein the first and second optically variable effect generating structures are fabricated separately and then joined together.

23. A method according to claim 22, wherein the first and second optically variable effect generating structures are laminated together with an intermediate laminating adhesive.

24. A method according to claim 23, wherein the laminating adhesive is UV curable, the joining step including irradiating the laminating adhesive through the first optically variable effect generating structure to activate the adhesive.

25. A method according to claim 17, wherein the dye or pigment comprises a photochromic material, a thermochromic material or a luminescent material in the laminating adhesive.

26. A method according to claim 17, wherein the first and second optically variable effect generating structures are provided on a carrier.

27. A method according to claim 26, wherein a release layer is provided between the carrier and the first and second optically variable effect generating structures.

28. A document carrying a security device manufactured according to claim 17.

29. A method according to claim 17, further comprising registering the discontinuous reflective metal layer with the surface relief microstructure of the first optically variable effect generating structure.

* * * * *